Patented Jan. 28, 1947

2,414,969

UNITED STATES PATENT OFFICE 2,414,969

PROCESS FOR PRODUCING AGGLOMERATED WATER TREATING COMPOSITIONS

Joe E. Moose, St. Louis, Mo., assignor to Monsanto Chemical Company, a corporation of Delaware No Drawing. Application March 13, 1943, Serial No. 479,141

8 Claims. (Cl. 252—175)

This invention relates to a method for producing aggregated or agglomerated phosphate products.

One object of this invention is to provide a process for producing an aggregated or agglomerated meta- or polyphosphate water treating composition. A further object is to provide an improved method which can be carried out largely by mechanical means and under conditions susceptible of control. A further object is to provide a process whereby the size of agglomerates produced may be controlled without substantial reversion of the meta- or polyphosphate product to orthophosphate. A still further object is to provide an agglomerated water treating composition comprising essentially sodium hexametaphosphate (Graham's salt) combined with the necessary amount of hydrated sodium carbonate so as to furnish a strong but readily soluble granule which will furnish a hydrogen ion concentration in water within the preferred range for efficient detergency.

This invention provides an improved method for producing the water treating compositions described in U. S. Patent No. 2,244,158, issued to F. E. Hubbard and C. R. McCullough.

One of the difficulties in agglomerating meta- or polyphosphates is the fact that such phosphates, when in contact with water, or water vapor tend to acquire a sticky or gummy consistency which adds to the difficulty of mechanically controlling and handling such moist products. After these phosphates become sticky and gummy there is great difficulty in uniformly proportioning the loose salt mixtures containing such sticky phosphates with the result that the granules tend during manufacture to become non-uniform in composition.

I have now found that the moisture necessary for agglomeration can very simply be incorporated into the mixture of salts to be agglomerated by introducing such water as the efflorescent hydrate of one of the agglomerate constituents. Since one of the constituents of such water treating compositions may for example be sodium carbonate, $Na_2CO_3$, it is convenient when this salt is employed to introduce the water to be used as the agglomerating agent, as the crystalline hydrate of sodium carbonate. I have found that such hydrates possess a substantial water vapor pressure and hence that the release of water from such hydrate to the more hygroscopic meta- or polyphosphate may be controlled by controlling the degree of hydration of such hydrated salt.

I have determined, for example, when producing agglomerates of sodium metaphosphate and sodium carbonate that I may conveniently employ the sodium carbonate in whole or in part as a hydrate, especially as a hydrate lower in water content than the fully hydrated salt. For example, I have found that a mixture of hydrates of $Na_2CO_3$ containing say from 20% to 45% of water of hydration may be intimately mixed with the ground hygroscopic metaphosphate and that then the rate of transfer of water from the hydrated salt to the metaphosphate is slow enough to permit intimate thorough mixing of the constituents before the development of a sticky condition takes place. The rate and amount of water released from the hydrated salt employed for agglomeration can be controlled by controlling the temperature at which agglomeration is carried out and accordingly the process may be adapted to straight line continuous agglomeration. Accordingly at no time is there sufficient water vapor present in contact with the phosphate that serious reversion may take place.

In contrast to this method the older methods usually provide for a spray of liquid water or of exposure of the agglomerating constituents to humidified air under which conditions the more hygroscopic materials in the mixture tended to acquire an excess of or more than their share of water. Since the hygroscopic constituent is the metaphosphate (or polyphosphate) there was danger that the moist metaphosphate containing an excess of water would, in part at least, revert to the orthophosphate. There was also, as a result of the older process, the tendency of certain parts of the agglomerating mixture to become too moist and consequently produce over-size material; while other parts of the mixture did not receive enough water to give satisfactory agglomeration and the development of sufficient strength to prevent shattering of the granule during handling.

The metaphosphates and polyphosphates treated in accordance with the present invention are compositions which contain varying ratios of $Na_2O$ and $P_2O_5$. They are ordinarily prepared by heating together either the corresponding orthophosphates or by heating together orthophosphoric acid and a sodium salt such as soda ash, $Na_2CO_3$. Such products are commonly termed molecularly dehydrated phosphates. The temperature to which the starting materials are heated is carried up to the sintering or reaction temperature and usually to the temperature at which a complete fusion is obtained. When a complete fusion is obtained the melt is congealed by quickly cooling the molten mass. The character of the resulting solid depends somewhat upon the ratio of $Na_2O$ to $P_2O_5$ employed in the starting products. Where the mol ratio of $Na_2O$ to $P_2O_5$ is 1:2, (17.9% $Na_2O$ and 82.1% $P_2O_5$ by weight) or even as high as 3:2, the product obtained is generally a clear, glassy, brittle, non-crystalline solid. When the product is as high in alkali as the 5:3 ratio a crystalline phase manifests itself by the development of translucency in the glassy matrix.

When preparing Graham's salt, ordinarily designated as sodium hexametaphosphate, $(NaPO_3)_6$, or compositions containing the same, it is desirable to heat the ingredients entering into the reaction to the fusion temperature and then quickly cool the melt in order to obtain the metaphosphate not only in the water soluble form but also in a form in which it will most efficiently act as a water softening agent.

The metaphosphate containing composition treated in accordance with this invention may have either a higher or a lower $Na_2O$ content than that corresponding to $NaPO_3$. Lower ratios may include the $Na_2O$ to $P_2O_5$ ratio of 1:2 (where the composition comprises sodium metaphosphate together with metaphosphoric acid, $HPO_3$). These lower ratios are also glass-like, brittle solids and somewhat more hygroscopic than the higher ratios. Other ratios include sodium metaphosphate itself $(NaPO_3)$ or $(NaPO_3)_6$, i. e., where the ratios are 1:1 and ranging upwardly including the following additional specific compositions:

| Composition equivalent to the formula— | Ratio $Na_2O:P_2O_5$ | Weight percent | |
|---|---|---|---|
| | | $Na_2O$ | $P_2O_5$ |
| $Na_{12}P_{10}O_{31}$ | 6:5 | 34.4 | 65.6 |
| $Na_6P_4O_{13}$ | 3:2 | 39.6 | 60.4 |
| $Na_5P_3O_{10}$ | 5:3 | 48.0 | 52.0 |

Mixtures of the above compounds may likewise be treated.

When the compositions are obtained as solid, glassy compositions, the brittle glass is readily ground to a fine powder, preferably of such a size as to pass through an 80 mesh screen. The powdered glass is then treated by the herein described process.

Applying my discovery to the agglomeration of sodium hexametaphosphate (the preferred embodiment) I proceed in the following manner: Approximately 16 parts by weight of hydrated sodium carbonate approximating the composition, $Na_2CO_3.3.55\ H_2O$, is first prepared by stirring ordinary dry soda ash with water in such proportions that say 37.5 parts of water are combined with 62.5 parts of $Na_2CO_3$. The above 16 parts of hydrated soda ash are now intimately mixed with 90 parts by weight of −80 mesh ground sodium hexametaphosphate. This intimate mixture remains dry for from 1 to 5 minutes after mixing when the temperature is between 10 and 30° C. The loose intimate mixture of the phosphate and carbonate is now passed through a rotating drum and after about from 3 to 5 minutes, after mixing agglomeration will start due to release of water from the hydrated salt. The degree of agglomeration can be controlled by the length of time the salt mixture is tumbled in the rotating drum, a longer time of tumbling producing a larger agglomerate. If low bulk density softer agglomerates are desired, the agglomerating action is continued until the desired size range (usually −10+80 mesh) is obtained. At this point the material is removed from the agglomerator and dried by exposure to warm air.

If a hard denser product is desired, the salt mixture after mixing is allowed to stand without agitation for from 5 to 10 minutes. The hydration of the phosphate takes place in the quiescent mass. The somewhat sticky mass is then mechanically shredded and passed into a rotary agglomerator or revolving drum and the particles rounded by the tumbling action within the drum.

The product, made in either case as above, is now subjected to drying preferably without agitation by exposure to air at a temperature of from 70° C. to 90° C. The dried product is very free flowing. Dissolved in water to form a 1% solution, this agglomerate would give a pH of about 8.2. For domestic detergent purposes a pH of from 8.0 to 9.0 is desired.

While the use of the mixed hydrates of sodium carbonate containing from 35% to 40% $H_2O$ is preferred, other hydrates either alone or mixed so as to approximate a water content of from 20% to 45% may be employed. For example, mixtures of the monohydrate and the decahydrate approximating a water content of from 35% to 40% or mixtures of the anhydrous salt and the decahydrate may also be used. Usually the water of hydration should be between 20% and 45% of the salt.

In general in the agglomeration of meta- and polyphosphates having a particle size of less than 80 mesh the water content of the hydrated salt should be so adjusted in amount and water content so as to furnish from 3 to 6% by weight of water in the mixture to be agglomerated.

For the purpose of modifying somewhat the properties of the agglomerate for treating various waters it is possible to incorporate other salts, or hydrates thereof, together with the sodium carbonate hydrate. Should it for example be desired to supply sulfate, orthophosphate or pyrophosphate ion to the treated water, it is possible to incorporate into the agglomerate, sodium sulfate, sodium orthophosphate or sodium pyrophosphate as a constituent thereof. When hydrates of these salts are employed, which hydrates are efflorescent with respect to the molecularly dehydrated phosphates, they may be employed in lieu of the hydrates of sodium carbonate.

The mechanism by which my agglomerates are formed comprises first a loss of part of the water of hydration of the hydrated salt, which water is then absorbed by the adjacent molecularly dehydrated phosphate particles with the formation of a sticky film on such particles. The agglomerate is then formed by the mechanical action of rolling the particles of salts over each other in the drum. Thus it will be noted that moisture transference takes place throughout the mass of particles at a uniform rate and to a uniform degree throughout the mass.

What I claim is:

1. The process for producing readily soluble agglomerates which are resistant to shattering during handling, which comprises intimately mixing about 16 parts by weight of finely divided hydrated sodium carbonate approximating the composition, $Na_2CO_3.3.55\ H_2O$, with 90 parts by weight of −80 mesh ground sodium hexametaphosphate to form a substantially dry mixture, allowing the mixture to stand without agitation until hydration of the phosphate takes place in the quiescent mass, mechanically shredding the sticky mass thus formed into irregularly shaped agglomerates and thereupon rounding the agglomerates by subjecting them to tumbling action within a revolving drum.

2. The process defined in claim 1 in which the agglomerated product is subjected to air drying at a temperature of from 70° C. to 90° C.

3. The process for producing readily soluble agglomerates which are resistant to shattering during handling which comprises intimately mixing a finely divided molecularly dehydrate sodium phosphate having a screen size of less than 80 mesh and a $Na_2O/P_2O_5$ molecular ratio of from 1:2 to 5:3 with a finely divided efflorescent hydrated salt selected from the group consisting of the hydrates of sodium carbonate, sodium sulfate, sodium orthophosphate and sodium pyrophosphate to form a substantially dry mixture, allowing the mixture to stand without agitation while heating same until hydration of said phosphate takes place in the quiescent mass, mechanically shredding the sticky mass thus formed into irregularly shaped agglomerates and thereupon rounding the agglomerates by subjecting them to tumbling action within a revolving drum, said hydrated salt being so adjusted in amount and water content as to furnish from 3% to 6% by weight of water in said substantially dry mixture.

4. The process for producing readily soluble agglomerates which are resistant to shattering during handling which comprises intimately mixing a finely divided molecularly dehydrated sodium phosphate having a screen size of less than 80 mesh and a $Na_2O/P_2O_5$ molecular ratio of from 1:2 to 5:3 with a finely divided hydrated sodium carbonate to form a substantially dry mixture, allowing the mixture to stand without agitation until hydration of said phosphate takes place in the quiescent mass, mechanically shredding the sticky mass thus formed into irregularly shaped agglomerates and thereupon rounding the agglomerates by subjecting them to tumbling action within a revolving drum, said hydrated salt being so adjusted in amount and water content as to furnish from 3% to 6% by weight of water in said substantially dry mixture.

5. The process defined in claim 4 in which the agglomerated product is subjected to air drying at a temperature of from 70° C. to 90° C.

6. The process defined in claim 4 in which the molecularly dehydrated sodium phosphate has a $Na_2O/P_2O_5$ molecular ratio of about 1:1.

7. The process defined in claim 4 in which the molecularly dehydrated sodium phosphate has a $Na_2O/P_2O_5$ molecular ratio of about 5:3.

8. The process defined in claim 4 in which the molecularly dehydrated sodium phosphate has a $Na_2O/P_2O_5$ molecular ratio of about 6:5.

JOE E. MOOSE.